May 21, 1946.  G. K. TOLNAI  2,400,668
TRANSMISSION DEVICE
Filed March 22, 1944
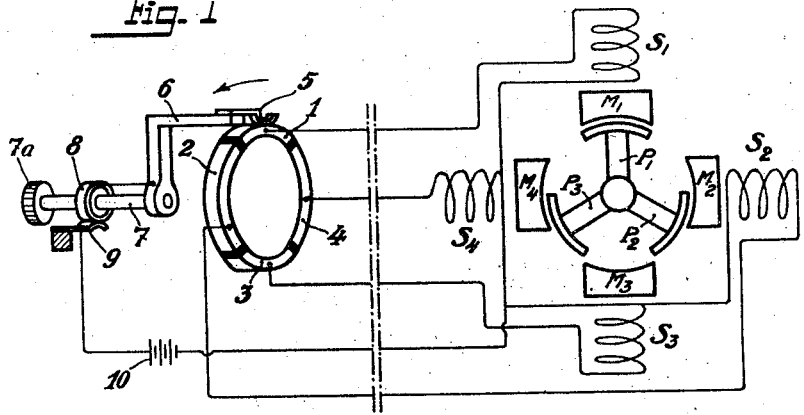
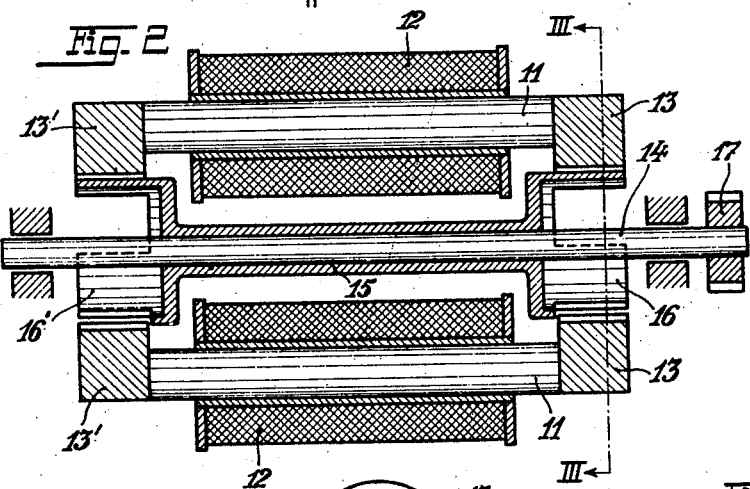
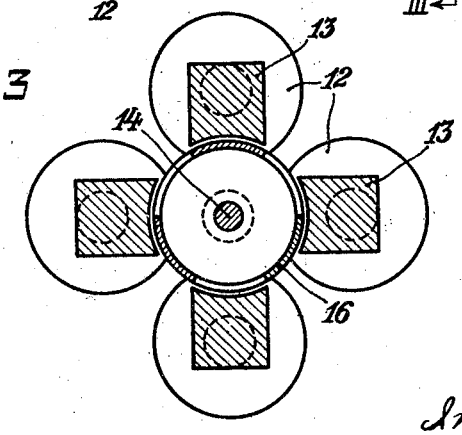 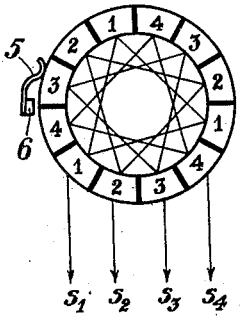
Inventor
Gabor K. Tolnai
by Sommers + Young
Attorneys Patented May 21, 1946

2,400,668

UNITED STATES PATENT OFFICE 2,400,668

TRANSMISSION DEVICE

Gabor Kornel Tolnai, Stockholm, Sweden, assignor to Arenco Aktiebolag, Stockholm, Sweden, a Swedish joint-stock company Application March 22, 1944, Serial No. 527,641
In Sweden September 1, 1941

1 Claim. (Cl. 172—239)

This invention relates to a transmission device and more particularly to a device for synchronous transmission of movements, which may be utilized for remote control of movements, especially for the remote indication of changes of position, as are used for the transmission of indications of changes in angles and distances to anti aircraft guns or other artillery appliances. The invention has particular adaptation to a device for synchronous transmission of movements, comprising a transmitter with a current distributor, a source of electric current and a receiver comprising an electric motor having a number of field coils connected electrically each to one of a number of electric contacts in said current distributor for connecting the coils successively to the source of electric current.

One object of the invention is to provide an improved form of receiver for a transmission device of this type, which receiver is so constructed, that it is adapted to follow very rapid movements and changes in the direction of the transmitter with great accuracy.

Another object of the invention is to provide a receiver, which has very small dimensions.

A further object of the invention is to provide a transmission device, in which a transmitter of very simple construction can be used and in which the members for connecting the transmitter with the receiver comprise a small number of electric conductors.

Still another object of the invention is to provide a receiver, in which the moving part is adapted to effect a great number of steps though connected to the transmitter by only a relatively small number of electric conductors.

A still further object of the invention is to provide a transmission device of said type in which the receiver, which comprises a motor, has a rotor of very little weight, which therefor is adapted to opposite a very small inertia to rapid accelerations.

Further objects and advantages of this invention will become apparent from the following detailed description of a preferred embodiment of the invention.

In the drawing:

Fig. 1 is a diagrammatic view of the transmission device with electrical connections.

Fig. 2 is a longitudinal section through one embodiment of the receiver motor.

Fig. 3 is a transversal section through the receiver motor on the line III—III in Fig. 2.

Fig. 4 is a diagrammatic view of a modified current distributor.

Referring to Fig. 1, the transmitter, which is shown on the left side of the figure, comprises four contact segments 1, 2, 3 and 4 arranged to form a ring with a circular contact surface, in which the contacts are insulated from each other. A sliding contact 5 cooperating with said contact surface is fastened on a crank formed arm 6 fixed on a shaft 7 the axis of which is concentric with the ring formed by the contact segments 1, 2, 3 and 4. The shaft 7 is in any known and appropriate manner, for example, by a cog wheel 7a, connected to the object, the movements of which are to be transmitted to the receiver. A sliding ring 8 on the shaft 7, electrically connected with the sliding contact 5, cooperates with a fixed sliding contact 9, which is connected to the one pole of a source of electric current 10, for example, a battery of accumulators.

The receiver, shown on the right side of Fig. 1 comprises a motor having four field coils $S_1$, $S_2$, $S_3$ and $S_4$, each of said coils being adapted to excite one of four magnet poles $M_1$, $M_2$, $M_3$ and $M_4$ forming the stator of the motor. Each of the four field coils $S_1$, $S_2$, $S_3$, $S_4$ is electrically connected to one of the four contact segments 1, 2, 3 and 4 in the transmitter and by a common return conductor to the source of electric current 10. The poles $M_1$, $M_2$, $M_3$, $M_4$, are arranged symmetrically around the axis of a rotor, i. e. at an angular distance of 90°. The rotor, which is made of a material with low coercive force, has three distinct poles $P_1$, $P_2$ and $P_3$ at an angular distance of 120° from each other.

In the position of the crank formed arm 6 as shown in Fig. 1 the sliding contact connects the field coil $S_1$ through the contact segment 1 to the source of electric current 10, and the excited stator pole $M_1$ attracts the nearest rotor pole $P_1$. When the shaft 7 in the transmitter is rotated so that the sliding contact 5 is moved in the direction of the arrow into contact with the segment 2, the current through the field coil $S_1$ is interrupted and the field coil $S_2$ is connected to the source of electric current 10. The stator pole $M_2$ thus excited attracts the nearest rotor pole $P_2$ and the rotor is thereby rotated an angle of 30° in counter-clockwise direction. When the movement of the sliding contact 5 is continued, this procedure is repeated with respect to coils $S_3$ and $S_4$, so that the stator pole $M_3$ attracts the rotor pole $P_3$ and the stator pole $M_4$ attracts the rotor pole $P_1$ and so on. When the sliding contact 5 has effected one revolution, the rotor has thus been rotated an angle of 120° only. The movements of the rotor can be utiilzed in a simple way by means of an appropriate transmission gearing. Instead of only one contact segment in the current distributor for each of the field coils, there may be two or more such contact segments for each coil equidistantly arranged around the distributor ring. In Fig. 4 is shown a distributor with 12 contact segments forming three groups with four segments 1, 2, 3, 4 in each group. The three segments numbered 1 are electrically connected with each other and with the field coil $S_1$; the segments 2 in each group with the field coil $S_2$, the segments 3 with the field coil $S_3$ and the segments 4 with the field coil $S_4$. When the sliding contacts makes one revolution around the distributor ring, the stator poles are excited in succession three times around the stator, and the twelve impulses produced by one revolution of the sliding contact 5 result in one whole revolution of the rotor. The sliding contact 5 and the rotor of the receiver motor will in this case rotate with the same speed. Any other relation between the speed of rotation of the sliding contact and the speed of the rotor in the receiver motor may be obtained by dividing the distributor ring in an appropriate number of groups containing each a number of contact segments equal to the number of field coils in the stator.

In Figs. 2 and 3 the construction of an embodiment of the electric motor of the receiver is shown. The stator of the motor comprises four magnet cores 11, with field coils 12 and pole shoes 13, 13' at both ends of the core. The cores 11 are arranged symmetrically around the shaft 14 of the motor and parallel with said shaft. The pole shoes 13, 13' have inwardly directed cylindrical pole surfaces facing the rotor, which comprises a cylindrical middle part 15 of little diameter and two end pieces 16, 16'. These end pieces are formed into relatively thin outwardly open cylinders, having an outer diameter so dimensioned in relation to the diameter between the pole faces of the stator, so that the rotor can be rotated between said pole faces with a small space between the end pieces of the rotor and said pole faces. Said end pieces have axial recesses for forming distinct pole shoes on the rotor end pieces between said recesses. The pole shoes of the rotor in both end pieces are placed in axial prolongation of each other. The shaft of the rotor is journalled in bearings, which are only diagrammatically shown in the drawing, and is provided with a cog wheel 17 for extracting the movements of the receiver. The absence of windings on the rotor, the lightness of its construction and the concentration of its material near its axis on the main part of its length concur to give the rotor the least possible moment of inertia, which permits very rapid movements and changes of movements or directions of the rotor.

In the preferred embodiment shown in the drawing and described heretofore there are four poles in the stator and three poles in the rotor of the motor of the receiver. Other numbers of poles can obviously be chosen according to the desired number of impulses necessary to rotate the rotor one revolution or according to the desired angle of rotation of the rotor when the sliding contact of the transmitter is sliding over to the next contact segment. For a compact construction of the receiver motor it is desired to have a little number of poles in the stator and the rotor, and a rule for the construction according to the invention is, that the number of impulses from the transmitter per revolution of the rotor is equal to the product of the numbers of poles in the stator and in the rotor. This can, however, only be obtained, when the numbers of poles in the stator and the rotor have no common divisor. If the number of poles in the stator differs by one from the number of poles in the rotor, the poles of the stator must be excited successively in a rotating sequence around the stator in order to obtain a stepwise rotation of the rotor with a number of steps per revolution that is equal to the product of the numbers of poles in the stator and in the rotor. If the stator has one pole more than the rotor, the rotor will rotate in a direction opposite to that of the excitation sequence of the stator poles. The motor may obviously be constructed so, that the numbers of poles in the stator and in the rotor differ by more than one pole. In this case, however, it will be necessary to choose a special sequence of excitation of the stator poles in order to obtain that the number of steps of rotation of the rotor becomes equal to the product of the numbers of poles in the stator and the rotor, as will become clear from the following example. If the stator has five poles numbered 1, 2, 3, 4, 5 in sequence around the stator and the rotor has three poles, the sequence of excitation of the stator poles must be 1—3—5—2—4, whereby the rotor is rotated one third of a revolution in five subsequent steps or one revolution in fifteen steps. If the sequence of excitation of the stator poles is 1—2—3—4—5, the rotor will rotate with double steps. There are lesser magnetic losses in the motor, if the excitation of the stator poles is effected successively in continuous sequence around the stator, and for the same effect it is preferable to have the rotor rotating in a direction opposite to the rotary direction of the exciting sequence of the stator poles. It is obvious, that a motor with only two poles in the rotor cannot work perfectly, as there always will be two rotor poles at equal distances from the stator pole not excited.

What I claim is:

A device for synchronous transmission of movements, comprising a source of current, a transmitter with a current distributor and a receiver motor having a stator and a rotor, said stator having a number of cores with distinct poles located one at each end of said cores around the axis of the motor and field coils connected to a number of electric contacts in said current distributor for successively exciting said cores, and said rotor having widened cylindrical, hollow ends with axial recesses separating unpolarised poles adapted to close the magnetic flux lengthwise and successively through the stator cores and the rotor, the numbers of pairs of poles in the stator and in the rotor having no common divisor.

GABOR KORNEL TOLNAI.